United States Patent
Roman

(10) Patent No.: US 6,814,266 B2
(45) Date of Patent: Nov. 9, 2004

(54) DEVICE FOR THE DISTRIBUTION OF WATER INTO VASES OR SIMILAR

(75) Inventor: Gianfranco Roman, Pasiano (IT)

(73) Assignee: Claber S.p.A. (IT)

( * ) Notice: Subject to any disclaimer, the term of this patent is extended or adjusted under 35 U.S.C. 154(b) by 210 days.

(21) Appl. No.: 10/177,046

(22) Filed: Jun. 21, 2002

(65) Prior Publication Data

US 2002/0195470 A1 Dec. 26, 2002

(30) Foreign Application Priority Data

Jun. 21, 2001 (IT) ................................... MI2001A1305

(51) Int. Cl.[7] ................................................ B67D 5/06
(52) U.S. Cl. ........................ 222/504; 222/67; 222/444; 137/398
(58) Field of Search .................... 222/504, 67, 422, 222/444; 137/398, 397, 433, 430, 391, 613; 47/79

(56) References Cited

U.S. PATENT DOCUMENTS

| | | | |
|---|---|---|---|
| 3,817,454 A | | 6/1974 | Pira |
| 4,083,147 A | * | 4/1978 | Garrick .......................... 47/80 |
| 4,304,528 A | | 12/1981 | Jordan |
| 4,447,983 A | | 5/1984 | Shinada |
| 4,574,841 A | * | 3/1986 | Hugler .................. 137/625.44 |
| 4,829,708 A | | 5/1989 | Gonzalez |
| 4,834,265 A | | 5/1989 | Snyder |
| 4,967,996 A | * | 11/1990 | Sonoda et al. ........... 251/30.02 |
| 4,978,101 A | * | 12/1990 | Nakaya et al. .......... 251/129.15 |
| 5,029,807 A | * | 7/1991 | Fuchs ........................... 251/65 |
| 5,599,003 A | * | 2/1997 | Seemann et al. ........ 251/30.03 |
| 5,678,600 A | * | 10/1997 | Locke et al. ................. 137/414 |
| 5,826,619 A | * | 10/1998 | Roman ................... 137/624.11 |
| 6,092,699 A | | 7/2000 | Schmidt |
| 6,145,806 A | * | 11/2000 | Dettmann ..................... 251/65 |
| 6,352,238 B1 | * | 3/2002 | Roman ......................... 251/65 |

FOREIGN PATENT DOCUMENTS

| | | |
|---|---|---|
| EP | 0 264 742 A1 | 4/1988 |
| EP | 1043528 A2 | 10/2000 |
| FR | 2 657 496 A1 | 8/1991 |

* cited by examiner

Primary Examiner—Gene Mancene
Assistant Examiner—Frederick C. Nicolas
(74) Attorney, Agent, or Firm—Akerman Senterfitt

(57) ABSTRACT

A device for the distribution of water into vases or similar objects. The device includes a water container, at least one tubular duct for the delivery of water to the outside and a control and programming device that establishes the quantity of water to be distributed in pre-established periods of time. The device for the distribution of water has a device for the control of the pressure of the quantity of water to be distributed that can keep the pressure of the quantity of water substantially constant, and an electric control delivery device located downstream of the device for the control of the pressure, upstream of the at least one tubular duct, and in flow connection with both. The delivery device is associated with the control and programming device in order to determine the delivery of the quantity of water.

4 Claims, 4 Drawing Sheets

DEVICE FOR THE DISTRIBUTION OF WATER INTO VASES OR SIMILAR

DESCRIPTION

The present invention concerns a device for the distribution of water into vases or similar.

In the state of the art devices for the distribution of water for vases of terraces or balconies are known, that are generally made up of a tank provided with hoses that are suitable to deliver the water to the vases. Such devices are typically utilised in terraces or balconies during periods of absence of the users.

One of the aforesaid devices currently in use comprises a tank provided with a float to feed a balancing tray drop by drop. The tray is arranged in such a way that, once filled with water, it turns upside down and it pours the amount of accumulated water onto the mouth of a plurality of small size hoses arranged in parallel that deliver the water directly into vases. In the case in which a user wants to exclude some vases from the water feeding, it is necessary to obstruct the mouth of the respective small hoses with appropriate stoppers. In this way the amount of water fed to the remaining vases increases since the quantity of water coming from the turnover of the tray remains constant but it must be subdivided into a lower number of small hoses.

Such device is quite complex and also not very precise since the quantity of water being delivered depends on the equilibrium point of the balancing tray and in addition it varies according to the number of small hoses that are open.

In view of the state of the art, scope of the present invention is to present a device for the distribution of water into vases or similar that overcomes the aforesaid disadvantages.

According to the present invention, such scope is attained by means of a device for the distribution of water into vases or similar comprising a water container, at least one tubular duct for the delivery of water and a control and programming device that establishes the quantity of water to be delivered in pre-established periods of time, characterised in that it comprises a device for the control of the pressure of the quantity of water to be delivered which is capable to maintain the pressure of said quantity of water substantially constant, and an electric control delivery device located downstream of said device for the control of the pressure and upstream of said at least one tubular duct upstream and in flow connection with both, said delivery device being associated with said control and programming device in order to determine the delivery of said quantity of water.

The characteristics and the advantages of the present invention will become evident from the following detailed description of an embodiment thereof, that is illustrated as a non-limiting example in the enclosed drawings, in which:

FIG. 5 is section view according to the line V—V of a detail of the device in FIG. 4.

Figure 1:
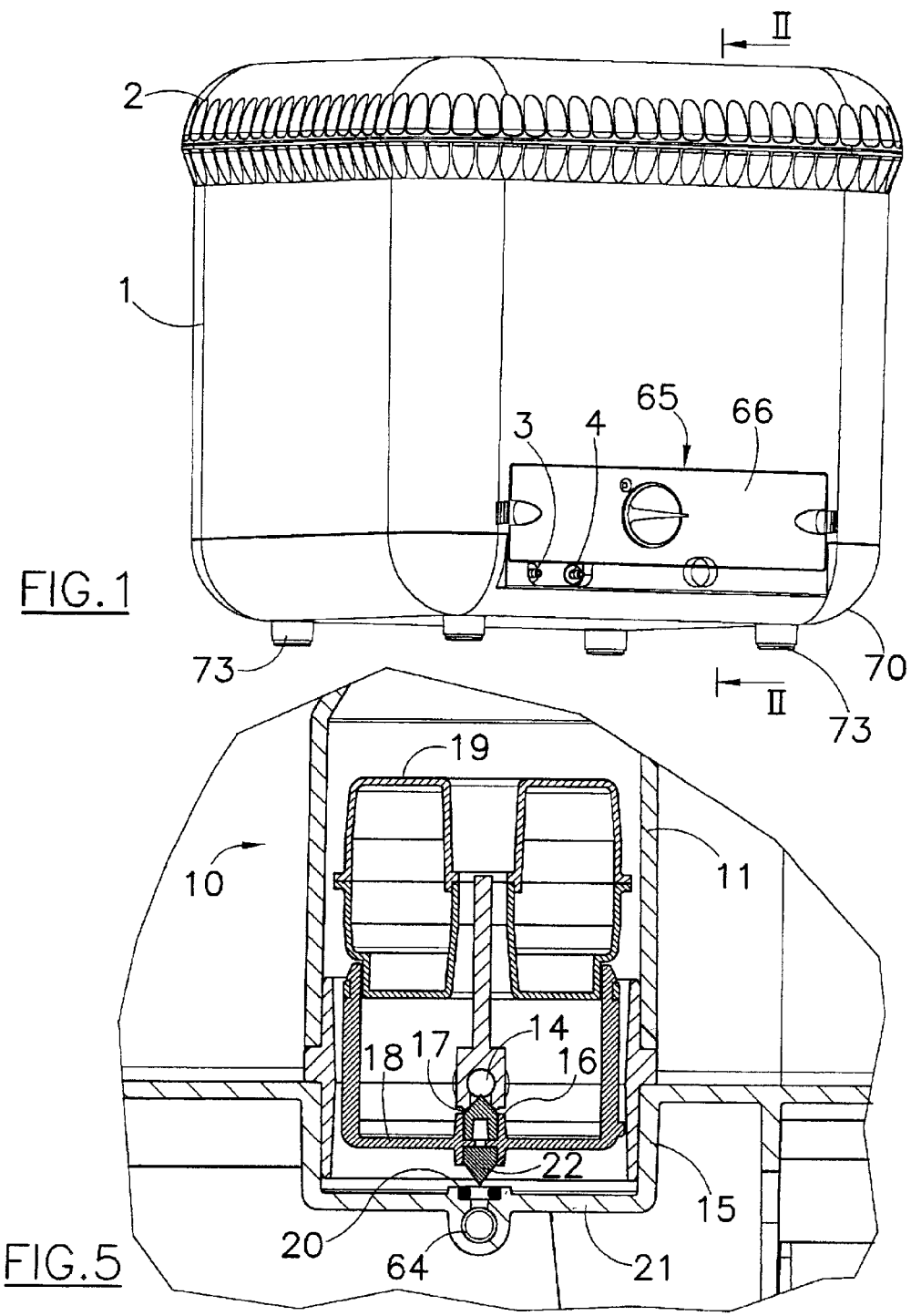
FIG. 1 is a perspective view of a device for the delivery of water according to the present invention.

With reference to FIG. 1 a device for the distribution of water according to the present invention is shown. Such device comprises a water container 1 provided with a cover 2 and an annular hose for the distribution of the water into the vases, not visible in the figures, provided with adjustable and closable drippers, one for each vase, and having the ends connected to delivery mouths 3 and 4 of the container 1.

Figure 2:
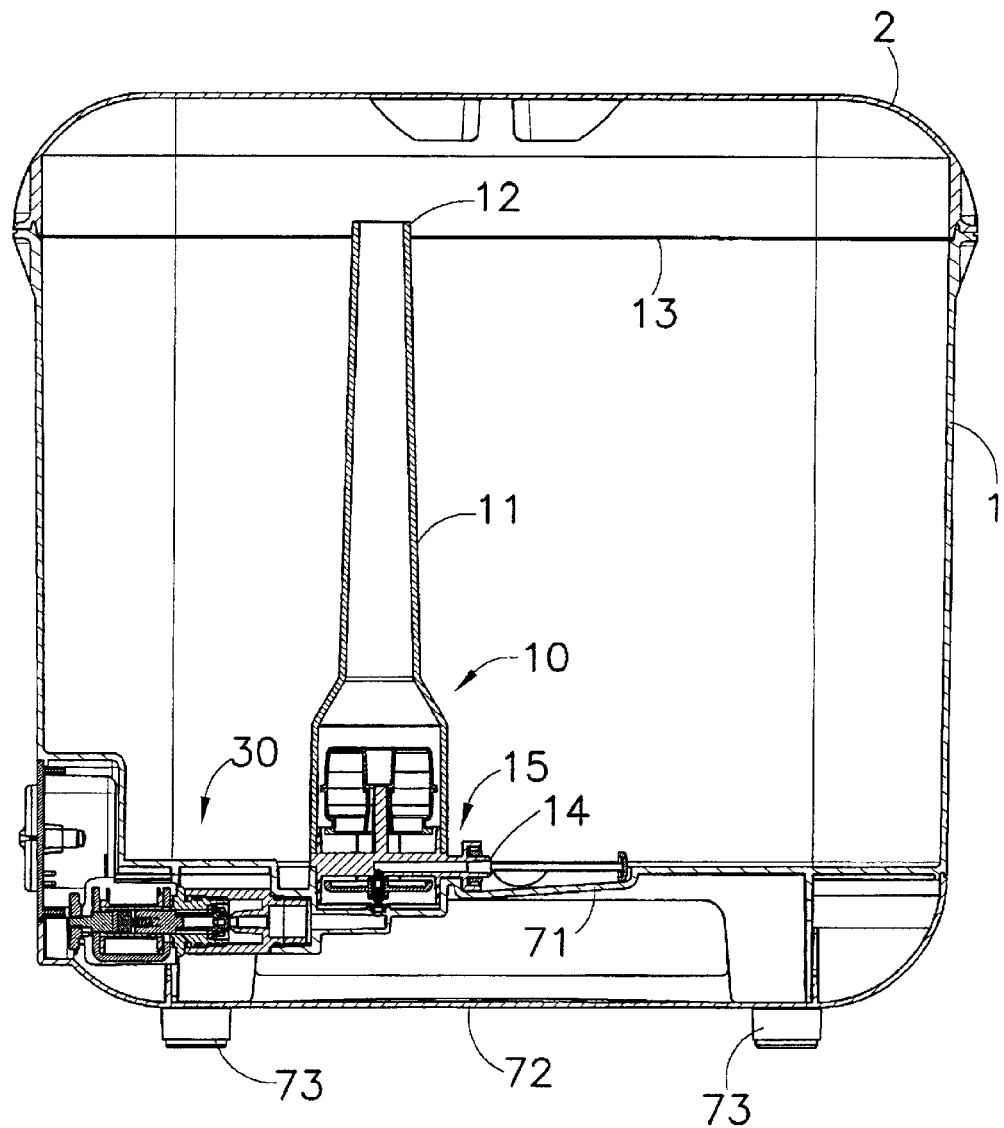
FIG. 2 is a section view according to the line II—II of the device in FIG. 1.
Figure 3:
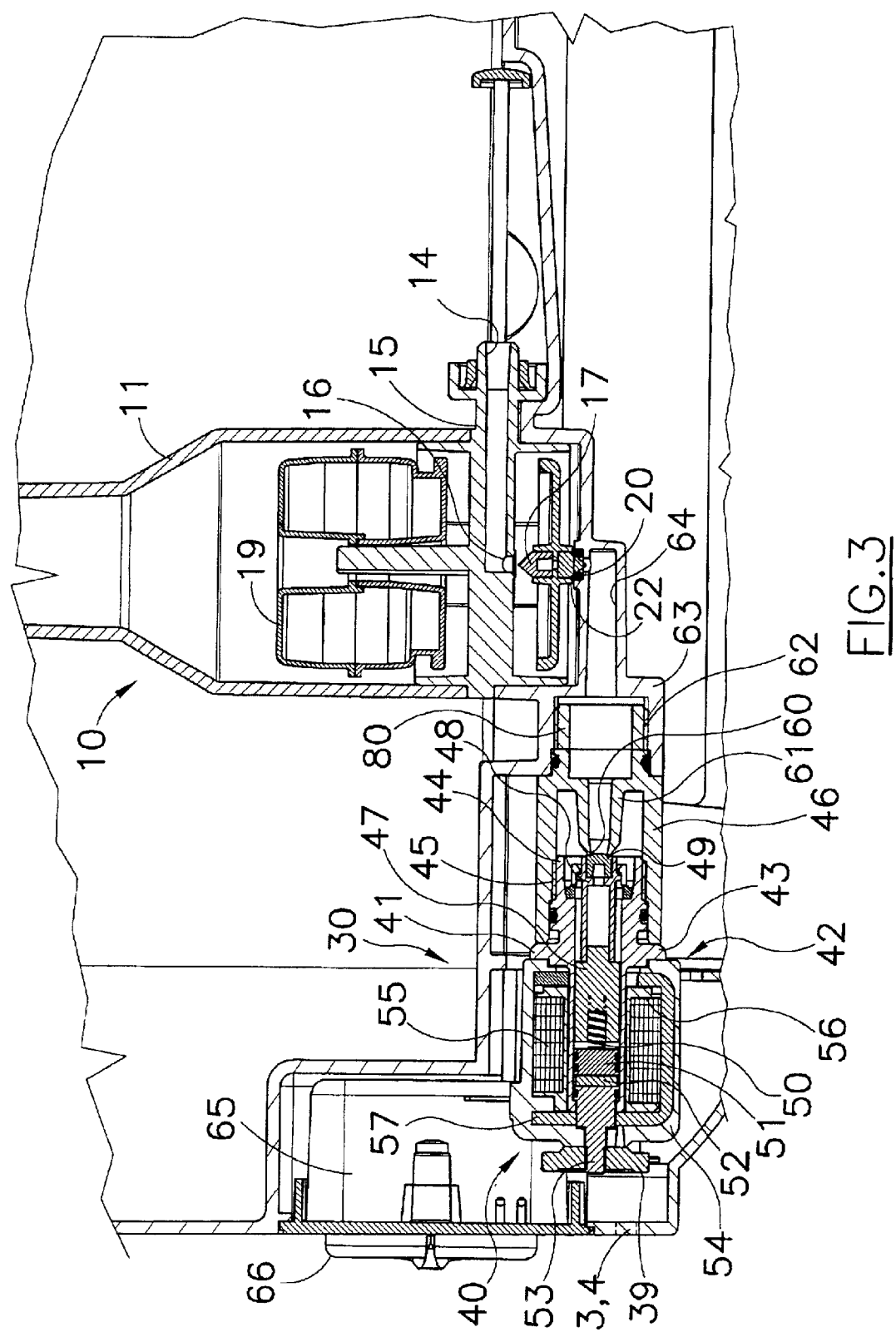
FIG. 3 is a more detailed view of a detail of FIG. 2 with float in a first position in order to allow the inflow of water into a chamber for the accumulation of water.
Figure 4:
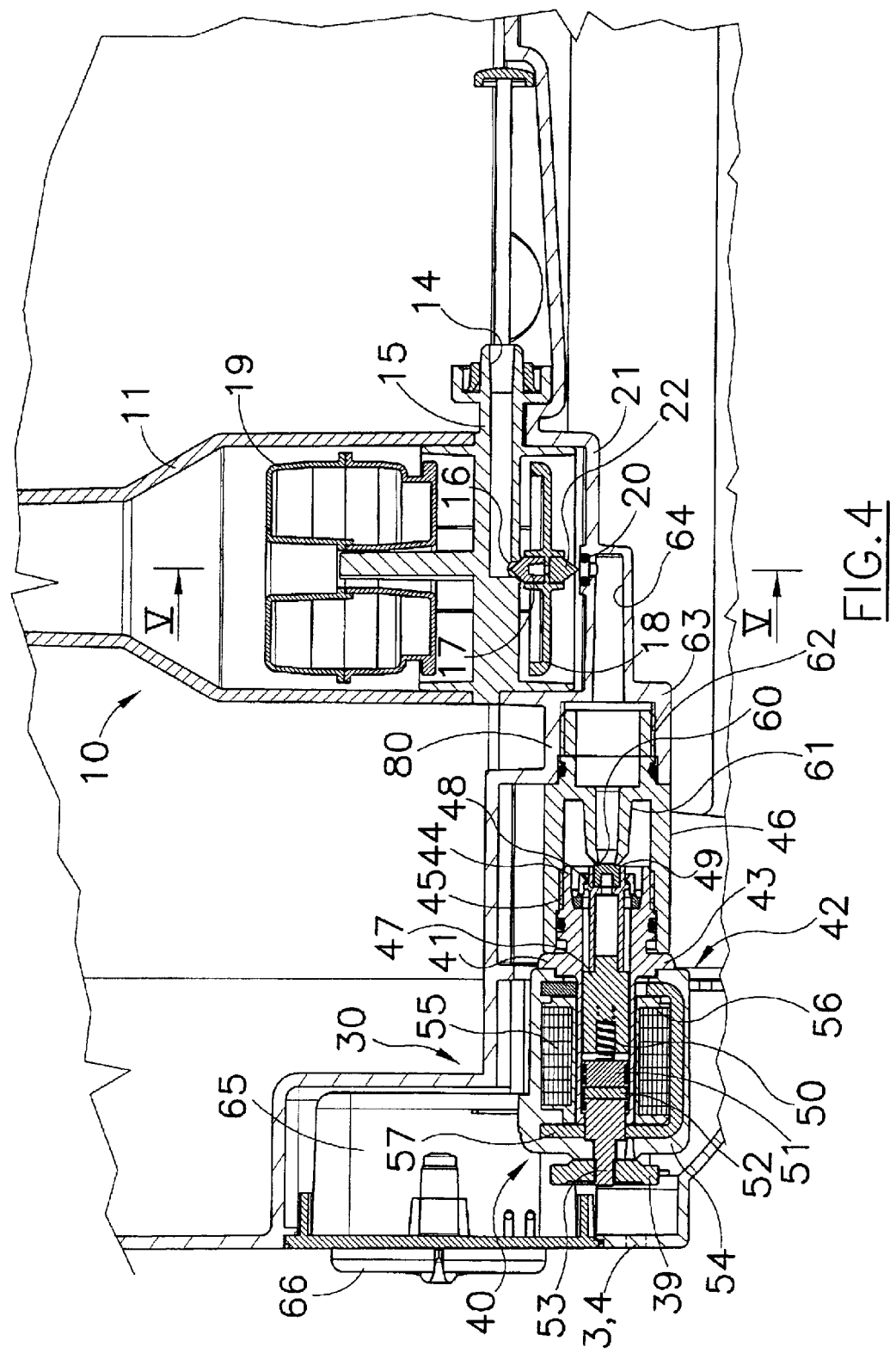
FIG. 4 is more detailed view of a detail of FIG. 2 with float in a second position so as to prevent the inflow of water into the chamber for the accumulation of water.

The device for the distribution of water comprises, inside of the container 1, a device 10 for the control of the pressure of the water and a device 30 for the delivery of the water, shown in FIG. 2 and more in detail in FIGS. 3, 4 and 5.

The control device 10 is made up of a chamber 11 with a shape lengthened towards the top, which is located inside the container 1. The chamber 11 is open at the top 12, that must exceed the maximum level of water 13 that can be reached inside the container 1. In this way the water of the container 1 can enter into the chamber 11 only from a duct 14 integral with the chamber 11 and located on its bottom part 15. The output opening 16 of the duct 14 in the chamber 11 is periodically closed by a stopper 17 located centrally on the top part of a body 18 coupled to a float 19 (FIG. 5). The chamber 11 is provided with another opening 20 on its bottom 21 that puts in flow communication 11 the chamber and the delivery device 30. The opening 20 is also periodically closed by a stopper 22 that is arranged centrally on the bottom part of the body 18; more precisely the opening 16 and the opening 20 are closed in alternated way in order to guarantee the inflow of water from the container 1 into the chamber 11 (opening 16 open and opening 20 closed as in FIG. 4) or the outflow of water from the chamber 11 towards the delivery device 30 (opening 16 closed and opening 20 opened as in FIGS. 3 and 5). The opening 16 stays open up until inside the chamber 11 a certain quantity of water is reached that is detected by the float 19 and it remains substantially constant for the water delivery and non-delivery periods from the water distribution device.

The delivery device 30 comprises a solenoid 40, for instance of the bistable type and supplied with direct current, as the one described in the European patent application EP 1043528. Such solenoid 40 is made up of two parts 41 and 42 normally kept together by a threaded unscrewable metal ring 39. The internal part 41 of the solenoid 40 comprises a tubular body 43 that ends with an axial appendix 44 insertable into a corresponding housing 45 of a body 46 for the connection of the chamber 11 with the solenoid 40. In the tubular body 43 the actuator element of the solenoid is housed in axially sliding way, that is a metallic piston 47 that has a tubular body for the support 48 of a tightness block 49 on one end and that is thrust at the other end by a spring 50 that reacts against one end of a pennanent magnet 51. The latter is provided with a high magnetism magnetic disc 52, for instance of neodymium, and it is housed inside a tubular body 43 and it has on the other end, a threaded tang 53 onto which the metal ring 39 is screwed.

The external part 42 of the solenoid 40 comprises a plastic shell 54 that incorporates an electric coil 55 with relative bobbin 56 and a cylindrical metal support 57 open on one side, that completes the magnetic circuit comprising magnet 51 and piston 47.

The external part 42 is mounted onto the internal part 41 in axially sliding way and it is kept in position by the metal ring 39 screwed onto the tang 53. The solenoid is provided with wires for the connection with batteries.

The tightness block 49 closes an opening 60 of a duct 61 integral with the body 46 and centrally axial to the same; the opening 60 is in flow connection with the mouths 3 and 4 and the annular hose. The body 46 ends with an axial appendix 80 insertable into a housing 62 of a hollow part 63 of the container 1. An additional duct 64 of said hollow part 63 allows the flow connection of the chamber 11 with the duct 61.

In addition there is provided a space 65 of the container 1 closed by a door 66 and housing a control and programming device for the setting of the watering periods and of the quantity of water to be distributed, and the batteries for the operation of the solenoid and the same control and programming device.

In the presence of water in the container 1, the water fills the chamber 11 through the duct 14 and the opening 16 thus causing the raise of the float 19 and a consequent closing of the opening 16 by means of the stopper 17. In this way the water can outflow from the chamber 11 through the opening 20 and flow through the ducts 64 and 61.

The delivery of a pre-established quantity of water is controlled by the control and programming device that sends a positive impulse to the coil 55 in order to excite it and to determine a magnetic field such as to have the piston 47 attracted by the magnet 51 and to cause the consequent removal of the block 49 from the opening 60.

The water can therefore outflow through the opening 60 and the mouths 3 and 4 in the annular hose for the delivery into vases or similar. The pressure of the delivered water is kept substantially constant by the chamber 11 since in the same chamber 11 there is always a constant certain quantity of water until there is water in container 1. The annular hose guarantees a uniform water flow rate for all the drippers. If some drippers are closed, the water flow rate remains constant for the remaining ones whereas the watering period increases as compared with the programmed one; in fact the lower daily water delivery from the container 1 determines a duration of the same for more days as compared with the pre-established ones.

Once the delivery of the pre-established quantity of water is over, the control and programming device sends a negative impulse to the coil 55 that determines the reverse movement of the piston 47 and the consequent closing of the opening 60 by means of the tightness block 49.

When the water inside the chamber 11 is about to finish, the float 19 lowers and it determines the closing of the opening 20 by means of the stopper 22 thus preventing that the delivery of water causes the formation of air bubbles above the residual level of water.

The bottom 70 of the container 1 is preferably made up of two parts, a top part 71 that condenses and a bottom impermeable part 72 provided with supporting feet 73. In this way the formation of condensate outside of the container 1 is prevented.

The solenoid can be also of the monostable type, without presence of the high magnetism disc but with a short circuit disc. In such case the single interruption of the start electric signal determines the reverse movement of the piston 47 so as to close the opening 60.

What is claimed is:

1. A device for distribution of water into vases or similar objects, comprising:

a water container;

at least one tubular duct for delivery of water;

a control and programming structure that establishes a quantity of water to be distributed in pre-established periods of time;

a pressure controller that controls pressure of the quantity of water to be distributed and is capable to of keeping the pressure of the quantity of water substantially constant;

an electric control delivery structure located downstream of said pressure controller, upstream of said at least one tubular duct and in flow connection with both, said electric control delivery structure being associated with said control and programming structure in order to determine the delivery of the quantity of water;

wherein said pressure controller comprises a chamber for accumulation of water provided with a float, said chamber being associated with a first duct in flow connection with said container and a second duct in flow connection with said electric control delivery structure, said chamber comprising stoppers integral with said float and suitable to close alternatively said first or said second duct in order to guarantee respectively the outflow of the water from the chamber towards the electric control delivery structure and the inflow of water from the container into the chamber in order to define a substantially constant quantity of water in the chamber.

2. The device according to claim 1, wherein said electric delivery device comprises a valve and a solenoid for the control of the valve, said solenoid comprising a permanent magnet, an electric coil for the excitation of the magnet, a sliding piston for the operation of the valve and means for the electric connection of the solenoid with said control and programming device.

3. The device according to claim 2, wherein said so solenoid is of bistable type.

4. The device according to claim 2, wherein said solenoid is of monostable type.

* * * * *